United States Patent
Chen et al.

(10) Patent No.: US 7,746,513 B2
(45) Date of Patent: Jun. 29, 2010

(54) SCANNER AND METHOD THEREOF

(75) Inventors: Yen-Cheng Chen, Chupei (TW);
Shing-Chia Chen, Ciaotou Township, Kaohsiung County (TW)

(73) Assignee: Avision Inc. (TW)

( * ) Notice: Subject to any disclaimer, the term of this patent is extended or adjusted under 35 U.S.C. 154(b) by 1486 days.

(21) Appl. No.: 11/098,304

(22) Filed: Apr. 4, 2005

(65) Prior Publication Data
US 2005/0219655 A1 Oct. 6, 2005

(30) Foreign Application Priority Data
Apr. 5, 2004 (TW) .............................. 93109389 A

(51) Int. Cl.
*H04N 1/04* (2006.01)
(52) U.S. Cl. .................. 358/474; 358/475; 358/509; 358/497; 358/486; 382/274; 382/275
(58) Field of Classification Search ................ 358/474, 358/497, 496, 486, 475, 509, 501, 505; 382/274, 382/275, 169
See application file for complete search history.

(56) References Cited

U.S. PATENT DOCUMENTS

| | | | |
|---|---|---|---|
| 5,515,181 A * | 5/1996 | Iyoda et al. ................. 358/474 |
| 6,211,975 B1 * | 4/2001 | Bryant ........................ 358/527 |
| 6,342,943 B1 * | 1/2002 | Nara ............................. 355/67 |
| 6,400,484 B1 * | 6/2002 | Wang et al. ............... 359/196.1 |
| 6,721,072 B1 * | 4/2004 | Tsai et al. .................... 358/471 |
| 6,765,206 B2 * | 7/2004 | Sugiyama et al. ........... 250/330 |
| 7,408,682 B2 * | 8/2008 | Ide .............................. 358/461 |
| 2002/0015196 A1 * | 2/2002 | Kitamura et al. ............ 358/505 |
| 2002/0071141 A1 * | 6/2002 | Katakura et al. ............ 358/474 |
| 2003/0189736 A1 * | 10/2003 | Ikeda .......................... 358/475 |
| 2005/0231768 A1 * | 10/2005 | Hsu et al. .................... 358/474 |

* cited by examiner

*Primary Examiner*—Negussie Worku

(57) ABSTRACT

A scanner including a light source, an optical module, a driving device, and a control unit is provided. The light source emits a light beam to the to-be-scanned document. The optical module includes a photo sensing device for receiving the light beam reflected by the to-be-scanned document. The driving device includes a position detecting device, for detecting a position of the optical module relative to the to-be-scanned document, and outputting a position feedback signal accordingly. The control unit includes a light source controller and a timer. The scanning method includes the steps of setting the value of K to 1; moving the optical module to read the $K^{th}$ scan line and adjusting the luminance of the light source to compensate exposure level of the $(K+1)^{th}$ scan line; and determining if K is smaller than N.

16 Claims, 4 Drawing Sheets

SCANNER AND METHOD THEREOF

This application claims the benefit of Taiwan application Serial No. 93109389 filed Apr. 5, 2004, the subject matter of which is incorporated herein by reference.

BACKGROUND OF THE INVENTION

1. Field of the Invention

The invention relates in general to a scanner and method thereof, and more particularly to a scanner with a driving device for feedback control and method thereof.

2. Description of the Related Art

Along with the advance in technology, scanners have become an indispensable image capturing device, while motor is an essential element for driving a photo sensing device to capture images. Direct current (DC) motor with the advantages of small size, low noise, low power consumption and low cost has now been widely adopted in a scanner.

Referring to FIG. 1A, a structural diagram of a DC motor based scanner according to prior arts is shown. Scanner 100 includes a scan flatbed 110, a chassis 120, a DC motor 130 and an application specific integrated circuit (ASIC) 140. The DC motor 130 drives the optical module 120 to move at a constant speed, meanwhile, the photo sensing device (not shown in the diagram) of the chassis 120, a charge coupled device (CCD) for example, captures images of scan lines of a to-be-scanned document 111 on the scan flatbed 110. The DC motor 130 has an encoder 132 for outputting a position feedback signal PF. The ASIC 140, according to the position feedback signal PF, controls the DC motor 130 to precisely position the chassis 120 to assure that the images captured are uniform in quality for each scan line.

However, due to the variation in speed control of the DC motor 130, the exposure time for different scan lines will not be the same. As shown in FIG. 1B, the scanner 100 uses the position feedback signal PF to determine the exposure time T1, T2, T3 of the photo sensing device sensing the to-be-scanned document 111. When the DC motor 130 drives the optical module 120 at a predetermined constant speed, the exposure time for reading a scan line is set to be T1=t2−t0. When the DC motor 130 drives the optical module 120 to sense a certain scan line at a speed higher than the predetermined speed, the exposure time for reading this scan line is set to be T2=t1−t0. When the DC motor 130 drives the optical module 120 to read a certain scan line at a speed lower than the predetermined speed, the exposure time for reading this scan line is set to be T3=t3−t0. For the exposure time T1, T2, T3 for reading different scan lines are not the same, according to the equation that exposure level=light density of the to-be-scanned document 111×responsivity of the photo sensing device ×exposure time×analog front end (AFE) gain, the exposure level for reading each scan line will be different and the quality of the captured image will be affected.

Referring to FIG. 1C, a circuit diagram of a DC motor based scanner disclosed in U.S. Pat. No. 6,037,584 is shown. Considering that the light density of the to-be-scanned document 111 and the spectral response of the photo sensing device are normally set to be constant, the patent adjusts the AFE gain dynamically to compensate the exposure time variation so that each scan line has the same exposure level.

Scanner 150 uses a DC motor 160 to drive an optical module 170 to scan the to-be-scanned document (not shown in the diagram). The DC motor 160 has an encoder 162 for outputting a position feedback signal PF to a timer 182 of an ASIC 180. An exposure control unit 184 controls the exposure time of the CCD 172 in the optical module 170 reading each scan line of the to-be-scanned document according to the position feedback signal PF. Data obtained by the CCD 172 as sensing the to-be-scanned document is output to an analog amplification unit 174 to be amplified. The ASIC 180 of the patent further includes a gain control unit 186, which is controlled by the exposure control unit 184 and the timer 182 to dynamically adjust the AFE gain of the analog amplification unit 174 to compensate exposure level variation of each scan line.

However, the scanner disclosed in above-mentioned patent needs to introduce an additional complicated circuit like the gain control unit 186 to the ASIC 180 in order to dynamically adjust the AFE gain, which makes the system more complicated.

SUMMARY OF THE INVENTION

It is therefore an object of the invention to provide a scanner and method thereof. The exposure level of each scan line read by the photo sensing device can be maintained constant by using the exposure time of each scan line to adjust the luminance of the light source, thereby providing scan images of stable quality.

The invention achieves the above identified object by providing a scanner including a light source, an optical module, a driving device, and a control unit. The optical module includes a photo sensing device. The light source is for emitting a light beam to the to-be-scanned document. The photo sensing device receives the light beam reflected by the to-be-scanned document for reading a number of scan lines of the to-be-scanned document. The driving device, for generating a relative movement between the optical module and the to-be-scanned document, has a position detecting device for detecting a position of the optical module relative to the to-be-scanned document and outputting a position feedback signal accordingly. The control unit includes a light source controller and a timer. The light source controller controls the luminance of the light source. The timer controls the light source controller according to the position feedback signal, so that the exposure level for each of the scan lines remains the same.

The timer calculates exposure time for each scan line according to the position feedback signal, then controls the light source controller and adjusts the luminance of the light source according to the exposure time, so as to compensate the exposure level for the next scan line. With a simple circuit comprising the light source controller and the timer, the exposure level for each of the scan lines remains constant and a stable image scanning quality will be achieved.

It is another object of the invention to provide a scanning method for a scanner for scanning N scan lines of a to-be-scanned document, wherein N is a natural number. The steps of the method are disclosed below. Set the value of K to 1. Read the $K^{th}$ scan line of the to-be-scanned document. Obtain $K^{th}$ exposure time for the $K^{th}$ scan line. Adjust the luminance of the light source to compensate exposure level for the $(K+1)^{th}$ scan line. Determine if K is smaller than N: if so, increase K by 1 and return to the step of reading the $K^{th}$ scan line of the to-be-scanned document.

The driving device moves the optical module to a $K^{th}$ position then outputs a $K^{th}$ position feedback signal corresponding to the $K^{th}$ position. The driving device moves the optical module to a $(K+1)^{th}$ position corresponding to the to-be-scanned document, then outputs the $(K+1)^{th}$ position feedback signal corresponding to the $(K+1)^{th}$ position. The optical module starts exposing the $K^{th}$ scan line according to the $K^{th}$ position feedback signal and stops exposing the $K^{th}$ scan line according to the $(K+1)^{th}$ position feedback signal.

Alternatively, the driving device moves the to-be-scanned document to a $K^{th}$ position corresponding to the optical module then outputs a $K^{th}$ position feedback signal corresponding to the $K^{th}$ position; the driving device moves the to-be-scanned document to a $(K+1)^{th}$ position corresponding to the optical module then outputs a $(K+1)^{th}$ position feedback signal corresponding to the $(K+1)^{th}$ position; and the optical module starts exposing the $K^{th}$ scan line according to the $K^{th}$ position feedback signal and stops exposing the $K^{th}$ scan line according to the $(K+1)^{th}$ position feedback signal. The $K^{th}$ exposure time is determined according to the $K^{th}$ position feedback signal and the $(K+1)^{th}$ position feedback signal. By adjusting the luminance of the light source according to the exposure time of each scan line, the quality of image scanning can be improved.

Other objects, features, and advantages of the invention will become apparent from the following detailed description of the preferred but non-limiting embodiments. The following description is made with reference to the accompanying drawings.

DETAILED DESCRIPTION OF THE INVENTION

The main feature of the invention lies in adjusting the luminance of the light source, which emits a light beam to a to-be-scanned document, according to exposure time of the photo sensing device for each scan line of the to-be-scanned document, so that the exposure level remains constant for each scan line and that a consistent image quality is achieved.

Figure 1A:
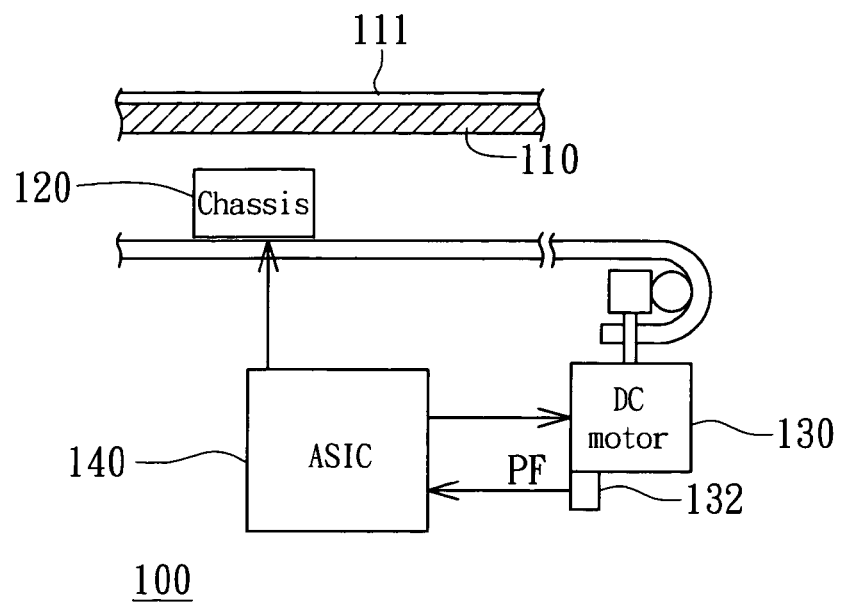
FIG. 1A is a structural diagram of a DC motor based scanner according to prior arts.
Figure 1B:
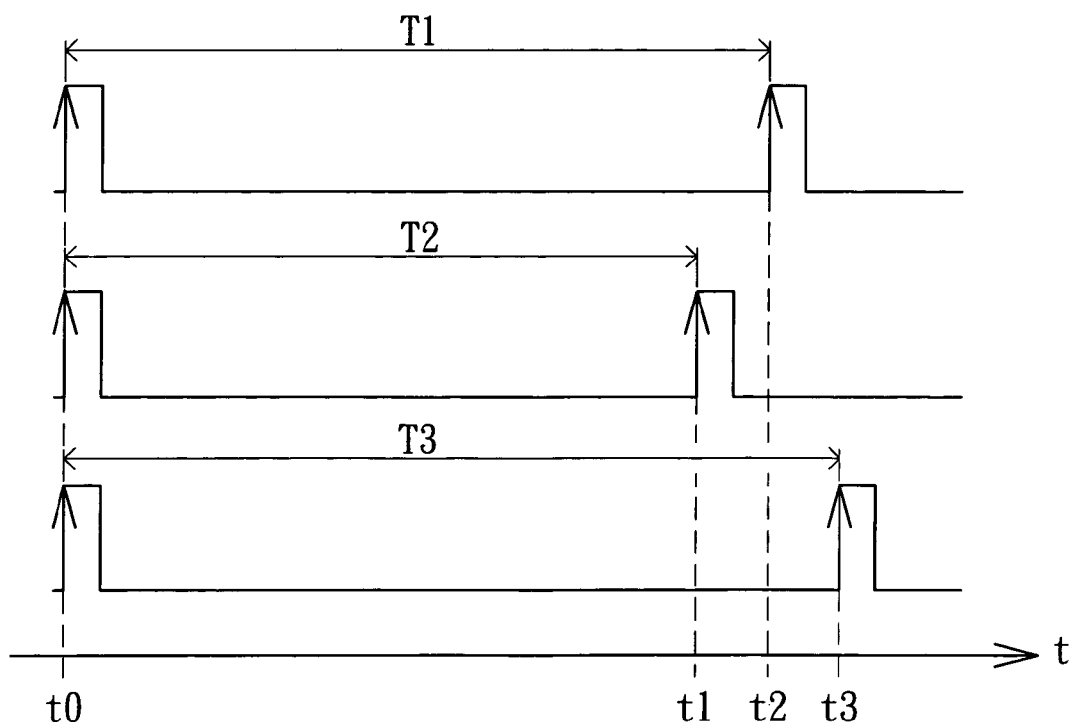
FIG. 1B is an exposure timing control diagram of the CCD in FIG. 1A.
Figure 1C:
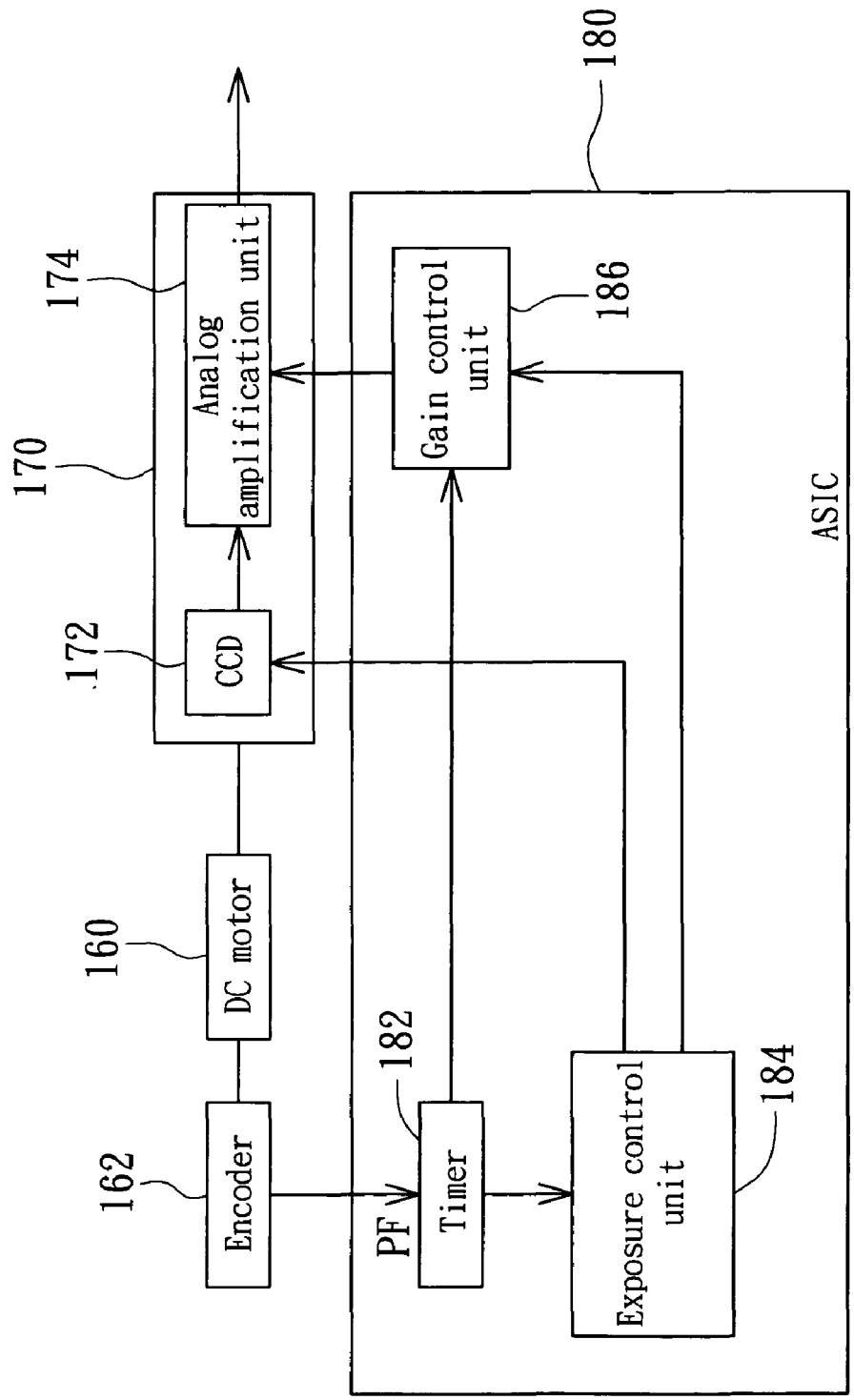
FIG. 1C is a circuit diagram of a DC motor based scanner disclosed in U.S. Pat. No. 6,037,584.
Figure 2:
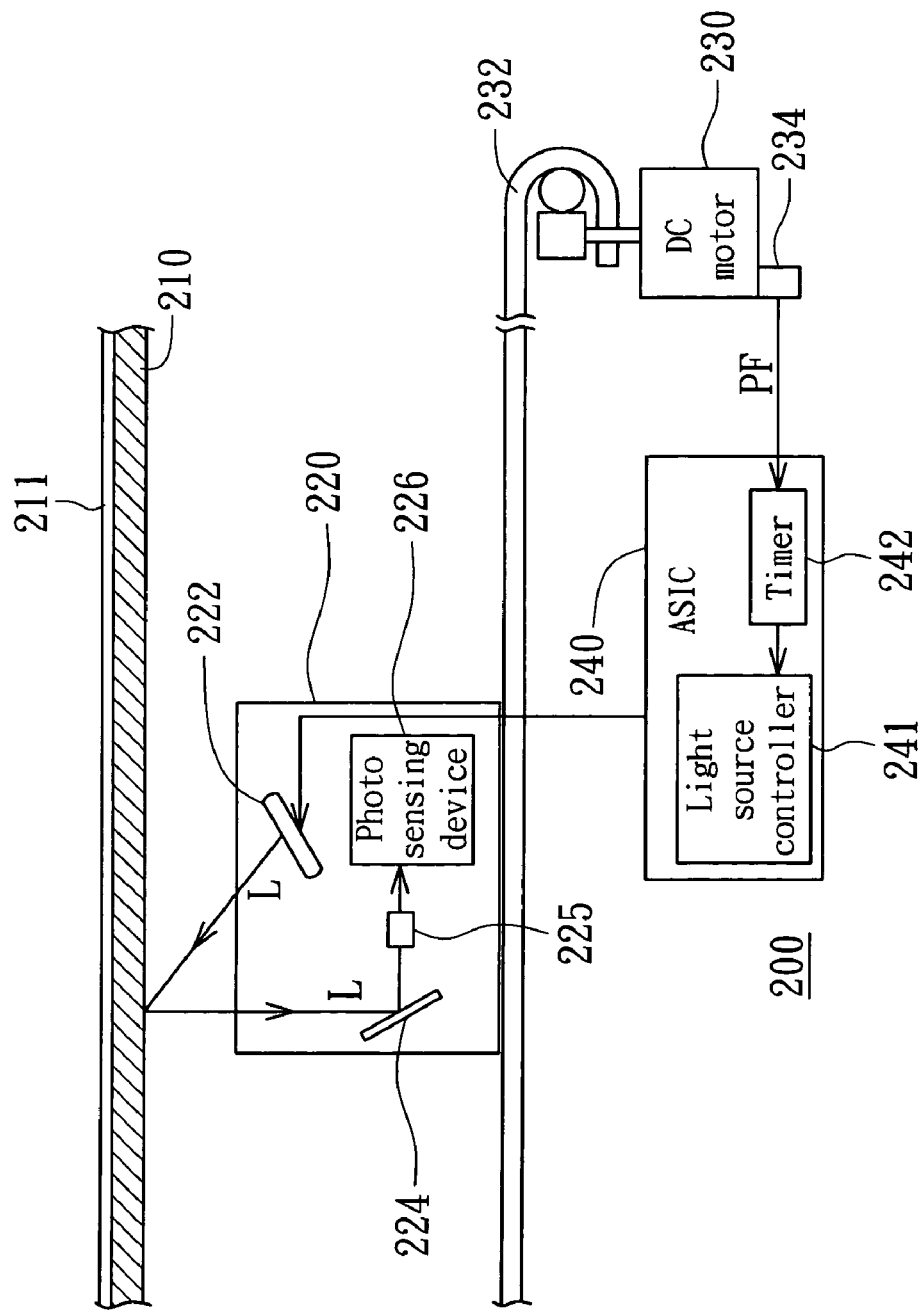
FIG. 2 is a structural diagram of the scanner according to a preferred embodiment of the invention.

Referring to FIG. 2, a structural diagram of the scanner according to a preferred embodiment of the invention is shown. Scanner 200 includes a scan flatbed 210, a chassis 220, a DC motor 230 and an application specific integrated circuit (ASIC) 240. The scan flatbed 210 is for carrying the to-be-scanned document 211 (a reflective document for example). The chassis 220 includes a light source 222, a mirror 224, a lens unit 225, and a photo sensing device 226, wherein the photo sensing device 226 can be a charge coupled device (CCD) or a contact image sensor (CIS) for example.

The light source 222 is for emitting a light beam L to the to-be-scanned document 211. The light beam L, after being reflected by the to-be-scanned document 211 and the mirror 224, is received by the photo sensing device 226 via the lens unit 225. The photo sensing device 226 is for reading N scan lines of the to-be-scanned document 211 (not shown in the diagram) and then outputting the image data corresponding to each scan line, where N is a natural number. For example, for a scanner with a resolution of 600 dpi, the photo sensing device 226 reads 600 scan lines per inch of the to-be-scanned document 211.

The DC motor 230 is for driving the chassis 220 via timing belt 232. The DC motor 230 has an encoder 234 for outputting a position feedback signal PF corresponding to a relative position of the chassis 220. Besides, the ASIC 240 includes a light source controller 241 and a timer 242. The light source controller 241 controls the luminance of the light source 222 by adjusting the driving voltage of the light source 222. The timer 242 calculates exposure time for which the photo sensing device 226 reads each scan line according to the position feedback signal PF, and controls the light source controller 241 to adjust the luminance of the light source 222 according to the exposure time to maintain equal exposure level of each scan line.

Figure 3:
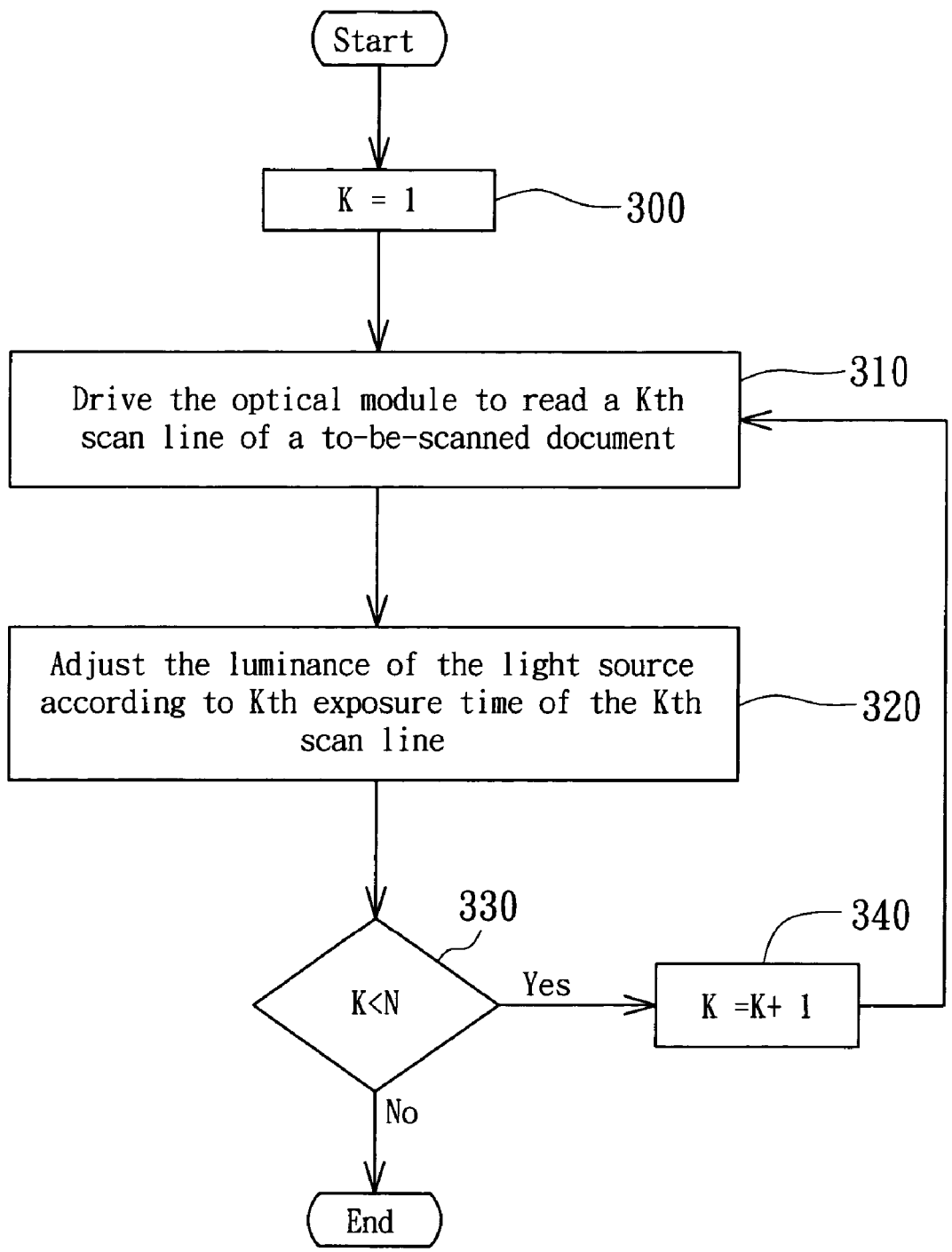
FIG. 3 is a flowchart of a scanning method according to a preferred embodiment of the invention.

Referring to FIG. 3, a flowchart of a scanning method according to a preferred embodiment of the invention is shown. Firstly, the method begins with step 300: set the value of K to 1, where K is a positive integer. Next, proceed to step 310: use the DC motor 230 to drive the chassis 220 to read the Kth scan line of the to-be-scanned document. The DC motor 230 drives the chassis 220 to a Kth position, and the encoder 234 outputs a Kth position feedback signal PF corresponding to the Kth position. The chassis 220 reads the Kth scan line of the to-be-scanned document 211 according to the Kth position feedback signal PF.

After that, proceed to step 320: adjust the luminance of the light source 222, according to exposure time T(K) for which the photo sensing device 226 reads the $K^{th}$ scan line, to compensate the exposure level of the $(K+1)^{th}$ scan line. The DC motor 230 drives the chassis 220 to move to a $(K+1)^{th}$ position, and the encoder 234 outputs a $(K+1)^{th}$ position feedback signal PF corresponding to the $(K+1)^{th}$ position. The photo sensing device 226 starts exposing the $K^{th}$ scan line according to the $K^{th}$ position feedback signal PF and stops exposing the $K^{th}$ scan line according to the $(K+1)^{th}$ position feedback signal PF. The timer 242 of the ASIC 240 calculates the $K^{th}$ exposure time T (K) according to the $K^{th}$ position feedback signal and the $(K+1)^{th}$ position feedback signal, and controls the light source controller 241 to adjust the luminance of the light source 222, and thus the light density of the to-be-scanned document 211, according to the exposure time T(K). Next, continue to compensate the exposure level of the $(K+1)^{th}$ scan line, repeating the preceding steps. Lastly, proceed to step 330: determine whether K is smaller than N or not: if so, proceed to step 340 to increase K by 1 and return to step 310, otherwise, the scanning process is completed.

As is disclosed above, despite the invention is exemplified by a reflective to-be-scanned document 211 and a DC motor 230, the invention can be applied in a transmissive document scanner or a scanner using other driving devices such as a step motor. Despite the above preferred embodiment is exemplified by a flatbed scanner, the invention can also be applied in a sheet-fed scanner, wherein the motor drives the to-be-scanned document, instead of the chassis. Therefore, all these will not be apart from the skill scope of the invention.

As disclosed in the above preferred embodiment, the feature of the scanner of the invention lies in adjusting the luminance of the light source to adjust the light density of the to-be-scanned document according to the exposure time for which the photo sensing device reads each scan line. So, variation in exposure level between different scan lines due to variation in exposure time can be compensated and calibrated so that a stable image scanning quality can be achieved. Unlike the method in prior art, requiring a complicated circuit to dynamically compensate the variation via AFE gain, the invention uses only a light source controller to adjust the luminance of the light source.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanner, comprising:

a light source, for emitting a light beam to a to-be-scanned document;

an optical module, comprising a photo sensing device for receiving the light beam reflected by the to-be-scanned document, for reading a plurality of scan lines of the to-be-scanned document;

a driving device for generating a relative movement between the optical module and the to-be-scanned document, wherein the driving device comprises a position detecting device for detecting a position of the optical module relative to the to-be-scanned document and outputting a position feedback signal accordingly; and a control unit, comprising a light source controller for controlling the luminance of the light source, and a timer for controlling the light source controller according to the position feedback signal, so that exposure level for each of the scan lines remains the same.

2. The scanner according to claim 1, wherein the timer calculates exposure time for each scan line according to the position feedback signal, and controls the light source controller to adjust the luminance of the light source according to the exposure time, so that the exposure level for each of the scan lines remains the same.

3. The scanner according to claim 1, wherein the position detecting device comprises an encoder.

4. The scanner according to claim 1, wherein the photo sensing device is a charge coupled device (CCD).

5. The scanner according to claim 1, wherein the photo sensing device is a contact image sensor (CIS).

6. The scanner according to claim 1, wherein the to-be-scanned document is a reflective document.

7. The scanner according to claim 1, wherein the to-be-scanned document is a transmissive document.

8. The scanner according to claim 1, wherein the scanner is a flatbed scanner having a scan flatbed to carry the to-be-scanned document, and the driving device moves the optical module to generate the relative movement.

9. The scanner according to claim 1, wherein the scanner is a sheet-fed scanner having a document feeding device, and the driving device drives the document feeding device to move the to-be-scanned document to generate the relative movement.

10. The scanner according to claim 1, wherein the driving device is a direct current (DC) motor.

11. The scanner according to claim 1, wherein the driving device is a step motor.

12. A scanning method for a scanner, for scanning a to-be-scanned document, the method comprising:

emitting a light beam to the to-be-scanned document by a light source;

receiving the light beam reflected by the to-be-scanned document by a photo sensing device of an optical module;

reading the N scan lines of the to-be-scanned document where N is a natural number by the photo sensing device;

generating a relative movement between the optical module and the to-be-scanned document and outputting a position feedback signal according to a position of the optical module relative to the to-be-scanned document by a driving device;

setting a K value to 1;

reading a $K^{th}$ scan line of the to-be-scanned document by the photo sensing device;

obtaining $K^{th}$ exposure time for the $K^{th}$ scan line by a timer;

adjusting the luminance of the light source according to the $K^{th}$ exposure time to compensate exposure level for a $(K+1)^{th}$ scan line by a light source controller; and increasing K by 1 if the value of K is smaller than N and returning to the step of reading the $K^{th}$ scan line of the to-be-scanned document by the control unit.

13. The method according to claim 12, wherein the step of sensing the $K^{th}$ scan line of the to-be-scanned document further comprises:

moving the optical module to a $K^{th}$ position and then outputting a $K^{th}$ position feedback signal corresponding to the $K^{th}$ position by the driving device;

moving the optical module to a $(K+1)^{th}$ position and accordingly outputting a $(K+1)^{th}$ position feedback signal corresponding to the $(K+1)^{th}$ position by the driving device; and starting exposing the $K^{th}$ scan line according to the $K^{th}$ position feedback signal and stop exposing the $K^{th}$ scan line according to the $(K+1)^{th}$ position feedback signal by the photo sensing device.

14. The method according to claim 13, wherein the $K^{th}$ exposure time is determined according to the $K^{th}$ position feedback signal and the $(K+1)^{th}$ position feedback signal.

15. The method according to claim 12, wherein the step of sensing the $K^{th}$ scan line of the to-be-scanned document further comprises:

moving the to-be-scanned document to a $K^{th}$ position and then outputting a $K^{th}$ position feedback signal corresponding to the $K^{th}$ position by the driving device;

moving the to-be-scanned document to a $(K+1)^{th}$ position and accordingly outputting a $(K+1)^{th}$ position feedback signal corresponding to the $(K+1)^{th}$ position by the driving device; and starting exposing the $K^{th}$ scan line according to the $K^{th}$ position feedback signal and stop exposing the $K^{th}$ scan line according to the $(K+1)^{th}$ position feedback signal by the photo sensing device.

16. The method according to claim 15, wherein the $K^{th}$ exposure time is determined according to the $K^{th}$ position feedback signal and the $(K+1)^{th}$ position feedback signal.

* * * * *